US011546157B2

(12) United States Patent
Ogle et al.

(10) Patent No.: US 11,546,157 B2
(45) Date of Patent: Jan. 3, 2023

(54) ADAPTIVE IDENTIFICATION SYSTEMS AND METHODS

(71) Applicant: Citrix Systems, Inc., Fort Lauderdale, FL (US)

(72) Inventors: Andrew Ogle, Amersham (GB); Yuri Kolesnikov, Raleigh, NC (US); Leo C. Singleton, IV, Fort Lauderdale, FL (US); Avijit Gahtori, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 672 days.

(21) Appl. No.: 16/456,389

(22) Filed: Jun. 28, 2019

(65) Prior Publication Data

US 2020/0374119 A1 Nov. 26, 2020

Related U.S. Application Data

(60) Provisional application No. 62/850,432, filed on May 20, 2019.

(51) Int. Cl.
*H04L 9/32* (2006.01)
*H04L 9/06* (2006.01)

(52) U.S. Cl.
CPC ............ *H04L 9/321* (2013.01); *H04L 9/0643* (2013.01); *H04L 2209/34* (2013.01)

(58) Field of Classification Search
CPC .... H04L 9/321; H04L 9/0643; H04L 2209/34
See application file for complete search history.

(56) References Cited

U.S. PATENT DOCUMENTS

| 2010/0313210 | A1* | 12/2010 | Lin ..................... H04L 61/4552 719/328 |
| 2018/0314723 | A1* | 11/2018 | Frantz, III ............ G06F 16/256 |
| 2018/0337905 | A1* | 11/2018 | Ogle ...................... H04L 63/08 |

OTHER PUBLICATIONS

"Active Directory Authentication", Citrix Systems, Inc., Jun. 12, 2019, retrieved from URL: https://docs.citrix.com/en-us/citrix-cloud/citrix-cloud-management/identity-access-management/connect-ad.html, 5 pages.

* cited by examiner

*Primary Examiner* — Hee K Song
(74) *Attorney, Agent, or Firm* — Finch & Maloney PLLC

(57) ABSTRACT

A computer system is provided. The computer system includes a memory and a processor coupled to the memory. The processor is configured to receive a first message from an identity provider, the first message including an arbitrary identifier generated by the identity provider, the arbitrary identifier being incompatible with a dependent process that is reliant upon the identity provider; encode, in response to reception of the first message, the arbitrary identifier into an encoded identifier that is compatible with the dependent process; and transmit a second message including the encoded identifier to the dependent process.

23 Claims, 6 Drawing Sheets

ADAPTIVE IDENTIFICATION SYSTEMS AND METHODS

RELATED APPLICATIONS

This application claims priority under 35 U.S.C. § 119 (e) to U.S. Provisional Application Ser. No. 62/850,432, titled "ADAPTIVE IDENTIFICATION SYSTEMS AND METHODS," filed May 20, 2019, which is hereby incorporated herein by reference in its entirety.

BACKGROUND

Identification of system elements is a fundamental computing concern. As such, practitioners skilled in the computing arts have developed a variety of conventions to identify various system elements. Identifiers generated using these conventions include universally unique identifiers (UUIDs), global unique identifiers (GUIDs), object identifiers (OIDs), and security identifiers (SIDS) to name only a few examples. Widely adopted identifiers, such as the aforementioned examples, are automatically generated by various identity providers and processed by a vast base of existing code.

SUMMARY

In at least one example, a computer system is provided. The computer system includes a memory and at least one processor coupled to the memory. The at least one processor is configured to receive a first message from an identity provider, the first message including an identifier generated by the identity provider; determine whether the identifier is an arbitrary identifier; encode, in response to a determination that the identifier is an arbitrary identifier, the identifier into an encoded identifier; and transmit a second message including the encoded identifier to a process dependent upon the identity provider.

At least some examples of the computer system can include one or more of the following features. In the computer system, the at least one processor can be further configured to receive, via the process, the second message; generate a third message addressed to the identity provider, the third message including the encoded identifier; decode, the encoded identifier to generate a copy of the arbitrary identifier; and transmit a fourth message including the copy of the arbitrary identifier to the identity provider. In at least some examples, the identity provider can be hosted by, integrated within, or otherwise interoperate with one or more directory services.

In at least one example, a computer system is provided. The computer system includes a memory and at least one processor coupled to the memory. The at least one processor is configured to receive a first message from an identity provider, the first message including an arbitrary identifier generated by the identity provider, the arbitrary identifier being incompatible with a dependent process that is reliant upon the identity provider; encode, in response to reception of the first message, the arbitrary identifier into an encoded identifier that is compatible with the dependent process; and transmit a second message including the encoded identifier to the dependent process.

At least some examples of the computer system can include one or more of the following features. In the computer system, the at least one processor can be further configured to generate, via the dependent process, a third message addressed to the identity provider, the third message including the encoded identifier; decode the encoded identifier to generate a copy of the arbitrary identifier; and transmit a fourth message including the copy of the arbitrary identifier to the identity provider. The encoded identifier can be a security identifier. The encoded identifier can store a value that designates the encoded identifier as being of an encoded type. The identity provider can be a directory service. The arbitrary identifier can be a global unique identifier.

In the computer system, to encode can include to execute a hash function to generate a hash value and to distribute the hash value into the encoded identifier. The at least one processor can be further configured to store an association between the encoded identifier and the arbitrary identifier in the memory. The at least one processor can be further configured to identity the association in the memory to decode the encoded identifier. In the computer system, to encode can include to execute a reversible encoding process and the at least one processor can be further configured to decode the encoded identifier by reversing the reversible encoding process.

In another example, a method of integrating identity providers with incompatible dependent processes executing on a computer system is provided. The computer system includes at least one processor coupled to a memory. The method includes acts of receiving, by the at least one processor, a first message from an identity provider, the first message including an arbitrary identifier generated by the identity provider, the arbitrary identifier being incompatible with a dependent process that is reliant upon the identity provider; encoding, by the at least one processor in response to receiving the first message, the arbitrary identifier into an encoded identifier that is compatible with the dependent process; transmitting, by the at least one processor, a second message including the encoded identifier to the dependent process; generating, by the at least one processor via the dependent process, a third message addressed to the identity provider, the third message including the encoded identifier; decoding, by the at least one processor, the encoded identifier to generate a copy of the arbitrary identifier; and transmitting, by the at least one processor, a fourth message including the copy of the arbitrary identifier to the identity provider.

At least some examples of the method can include one or more of the following actions. In the method, the act of encoding can include an act of generating a security identifier storing a value that designates the encoded identifier as being of an encoded type. The act of receiving the first message can include an act of receiving a message from a directory service that includes a global unique identifier. The act of encoding can include an act of executing a hash function to generate a hash value and distributing the hash value into the encoded identifier.

The method can further include an act of storing an association between the encoded identifier and the arbitrary identifier in the memory and the act of decoding the encoded identifier can include an act of identifying the association stored in the memory. The act of encoding can include an act of executing a reversible encoding process and the act of decoding the encoded identifier can include reversing the reversible encoding process.

In at least one example, a non-transitory computer readable medium is provided. The computer readable medium stores computer executable instructions to integrate identity providers with incompatible dependent processes. The computer executable instructions comprising instructions to receive a first message from an identity provider, the first message including an arbitrary identifier generated by the identity provider, the arbitrary identifier being incompatible with a dependent process that is reliant upon the identity provider; encode, in response to receiving the first message, the arbitrary identifier into an encoded identifier that is compatible with the dependent process; transmit a second message including the encoded identifier to the dependent process; generate, via the dependent process, a third message addressed to the identity provider, the third message including the encoded identifier; and decode the encoded identifier to generate a copy of the arbitrary identifier.

In the computer readable medium, the computer executable instructions can further include instructions to transmit a fourth message including the copy of the arbitrary identifier to the identity provider. The instructions to encode can include instructions to generate a security identifier storing a value that designates the encoded identifier as being of an encoded type. The instructions to receive the first message can include instructions to receive a message from a directory service that includes a global unique identifier. The instructions to encode can include instructions to execute a hash function to generate a hash value and distribute the hash value into the encoded identifier. The computer executable instructions can further include instructions to store an association between the encoded identifier and the arbitrary identifier in a memory and the instructions to decode the encoded identifier include instructions to identify the association stored in the memory. The instructions to encode can include instructions to execute a reversible encoding process and the instructions to decode the encoded identifier can include instructions to reverse the reversible encoding process.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
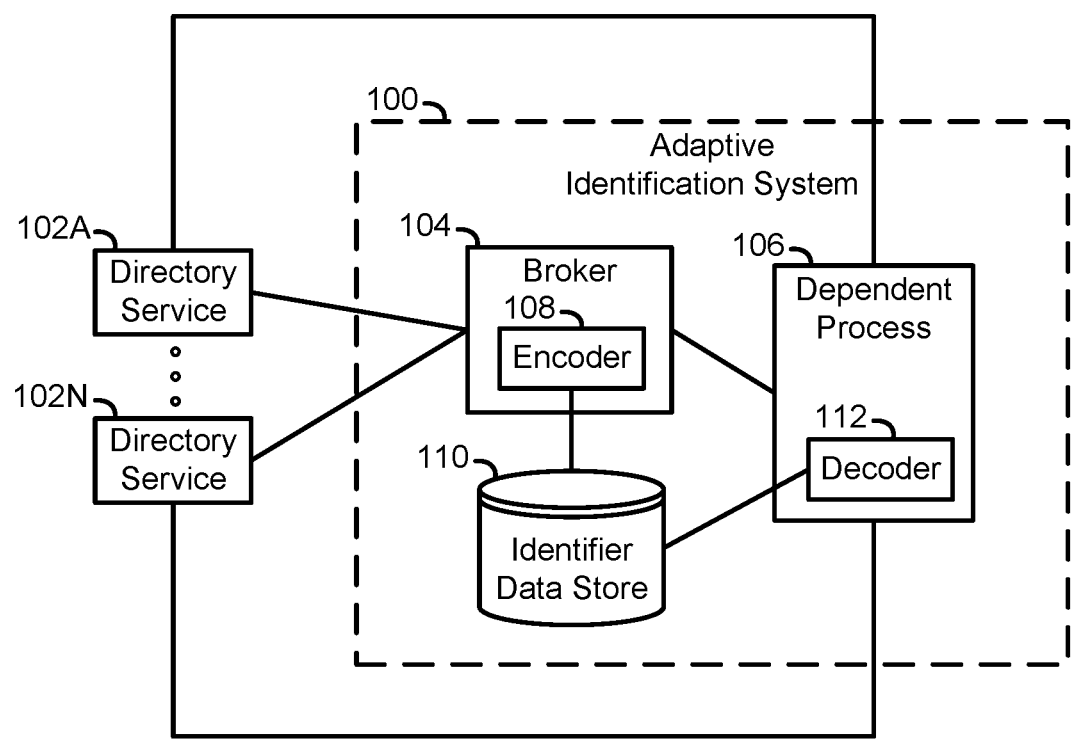
FIG. 1 is a block diagram of an adaptive identification system in accordance with an example of the present disclosure.

As summarized above, various examples described herein are directed to adaptive identification systems and methods for use with computing devices. These systems and methods overcome technical difficulties that can result from the introduction of new identity providers to existing computer systems. Such technical difficulties can include processes that are incompatible with the new identity providers due to differences between identifiers generated by the new identity providers and identifiers upon which the processes are configured to operate.

For instance, in at least one example, processes configured to operate on identifiers generated by an on-premises directory service (e.g., a Microsoft® Active Directory® service) are incompatible with a cloud-based directory service (e.g., Microsoft® Azure® Active Directory® service). This incompatibility arises from the on-premises directory service's use of SIDs to identify users, devices, and other trustees vis-à-vis the cloud-based directory service's use of GUIDs for the same purpose. As SIDs and GUIDs have differing structures and semantics, SIDs and GUIDs are not programmatically interchangeable. Therefore, processes configured to operate on SIDs alone are incompatible with, and cannot successfully process, GUIDs.

One approach to addressing this incompatibility is to refactor of the executable code underlying the processes to support identifiers generated by multiple identity providers. But this approach is unsatisfactory because it requires substantial development for each new identity provider, as each identity provider emerges.

To overcome these and other limitations that will be apparent upon reading and understanding the present disclosure, some examples described herein are directed towards computing devices, systems, and methods configured to map arbitrary, unique identifiers into standard identifiers (e.g., SIDs) that are compatible with pre-existing executable code. These arbitrary identifiers can be generated by various identity providers, such as on-premises or cloud-based directory services. By mapping the arbitrary identifiers into standard identifiers and mapping the standard identifiers into arbitrary identifiers, the devices, systems, and methods described herein enable processes to be compatible and interoperate with new identity-providers without substantial code refactoring, thus allowing for rapid integration of new identity providers.

In some examples, a process for encoding arbitrary identifiers into standard identifiers is provided. The arbitrary identifiers can be, for example, strings that uniquely identify users of a system, or other system elements, in a first directory service. The standard identifiers can be, for example, SIDs that uniquely represent the users in a second directory service. The executable code configured to implement this process can be part of, or interfaced with, an intermediate component that is located between the directory service and existing processes that are dependent upon the directory service. The intermediate component can be configured to receive an inbound message requesting assignment of a directory object to a resource managed by a dependent process. For example, the inbound message can include the directory object's unique identifier string, e.g. "OID:/AzureAD/af540e03-aee9-4b71-95fb-53a0a1c97970". The intermediate component can convert the string into a SID that can be operated upon by the dependent process. Additionally or alternatively, the dependent process can generate an outbound message requesting information from the identity provider. The intermediate component or the dependent process can decode the SID back into the directory object's unique identifier string before transmitting the outbound request to the directory service.

In some examples, to encode the string into a SID, the intermediate component takes a hash of the string to generate a hash value and distributes the binary bytes of the hash value into a SID's sub-authority fields. In these examples, a lookup table can be maintained for converting this new encoded SID back to the original unique identifier string. As part of the string-to-encoded-SID conversion, the intermediate component can check the lookup table for the existence of a record storing the encoded SID. If such a record does not exist in the lookup table, the intermediate component stores a new mapping of the string to the encoded SID in the lookup table.

In some examples, encoded SIDs are identified as non-windows SIDs by the use of the IdentifierAuthority field in the SID. A pre-defined value of "255," meaning a SID starting in "S-1-255," in the identifier authority denotes that a SID is an encoded SID for a user account. Future identifier authorities, such as 254, can identify other directory objects, such as virtual machine accounts.

In some examples, encoding and decoding processes are executed by a Citrix® broker component. In these examples, dependent processes, such as Citrix® Broker Powershell SDK and Citrix® Director, can receive encoded SIDs which can be treated virtually identically to SIDs generated by other directory services by the dependent processes. If a dependent process needs to make a directory query to look up information about the encoded SID, such as username, the dependent process can first determine that the encoded SID is an encoded identifier by looking at the identifier authority field, then decode the encoded SID back to the original unique identifier by using the lookup table. The directory can then be queried by using the object's unique identifier.

In at least one example, the following sequence of actions can be taken within an adaptive identification system to make use of encoded SIDs. A dependent process can receive an event stating that a user within a SID of S-1-255-123-123-123-123-123-123-123-123-123 has launched a session. The dependent process can pass this encoded SID through its existing code as if it was an ordinary Windows SID. The dependent process can store the encoded SID as a user ID for the session using existing code. An administrator using the dependent process can later decide to look for a record of sessions launched by the system. The dependent process can find a session with the encoded SID S-1-255-123-123-123-123-123-123-123-123-123. The dependent process can identify this SID as an encoded SID due to it beginning with S-1-255. The dependent process can decode the encoded SID to OID:\citrix\User1@cirix.com using the lookup table. The dependent process can query the new identity provider with OID:\citrix\User1@cirix.com for full object details to determine the user's username and other information for the administrator.

In some examples, the encoding used by the encoder is a one-way encoding that executes a hash function to convert a string of arbitrary length into a known length of 32 bytes before distributing the 32 bytes into the format of a SID. In other examples, data of a well-known length can be reversibly converted directly into binary bytes, then encoded into SID sub-authorities without the use of a hash function to provide encoding and decoding without the need for a lookup table.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Adaptive Identification System

In some examples, adaptive identification systems are configured to map arbitrary identifiers to standard identifiers and to map standard identifiers to arbitrary identifiers. These identifiers can include SIDs, GUIDs, first name/last name combinations, emails addresses, and other identifiers. FIG. 1 illustrates a logical architecture of an adaptive identification system 100 in accordance with these examples. As shown in FIG. 1, the system 100 includes a broker 104, dependent process 106, and an identifier data store 110. The dependent process 106 is reliant upon one or more directory services 102A-102N and operates upon identifiers generated by the one or more directory services 102A-102N. The one or more directory services 102A-102N may be referred to collectively as the directory services 102 and any one of one or more directory services 102A-102N may be referred to as a directory service 102. As shown in FIG. 1, the broker 104 includes an encoder 108 and the dependent process includes a decoder 112.

In certain examples, the broker 104 is configured to act as an intermediary between the directory services 102 and the dependent process 106. In these examples, the broker 104 is configured to expose and implement a system interface to process messages from the directory services 102 that include standard and/or arbitrary identifiers of system elements defined within the directory services 102. The broker 104 can be configured to execute a variety of actions when processing these messages. For instance, the broker 104 can be configured to receive and parse the messages to identify arbitrary identifiers, encode the arbitrary identifiers to generate encoded identifiers, and provide messages to the dependent process 106 that include the encoded identifiers. These encoded identifiers are a type of standard identifier in that the encoded identifiers conform to the same conventions regarding structure and semantics as the standard identifiers. Therefore, the encoded identifiers are compatible with the dependent process 106. Further details regarding the processing that the broker 104 is configured to execute in various examples is described further below with reference to FIGS. 6-8.

In some examples, to encode the arbitrary identifiers, the broker 104 is configured to invoke the encoder 108 and to provide the encoder 108 with the arbitrary identifiers. In these examples, the encoder 108 is configured to execute an encoding process to generate standard, encoded identifiers corresponding to the arbitrary identifiers. For instance, in at least one example, the arbitrary identifiers are GUIDs that are encoded into standard SID identifiers Further details regarding encoding processes that the encoder 108 is configured to execute in various examples are described further below with reference to FIGS. 6-8. However, regardless of the particulars of the encoding process, the structure and semantics of the standard identifiers generated by the encoder 108 are compatible with and can be successfully processed by the dependent process 106.

In certain examples, the broker 104 is configured to store an association between arbitrary identifiers and standard identifiers within the identifier data store 110. In at least some of these examples, each record stored in the data store 110 includes fields sized and typed to store both an arbitrary identifier and an encoded identifier. In these examples, the data store 110 stores an association between an arbitrary identifier and an encoded identifier by storing the two identifiers in a single record. Other examples may establish and store associations between identifiers within the identifier data store 110 using different conventions. Thus the examples disclosed herein are not limited to a particular approach to associating arbitrary and encoded identifiers. TABLE 1 illustrates an example of the identifier data store 110 that includes two associations.

TABLE 1

| Arbitrary Identifier | Encoded Identifier |
|---|---|
| OID:\citrix\User1@cirix.com | S-1-255-123-123-123-123-123-123-123-123 |
| OID:\shrefile\User2@citrix.com | S-1-255-321-321-321-321-321-321-321-321 |

In some examples, the dependent process 106 is configured to execute a variety of operations, some of which collaborate with one or more of the directory services 102. For instance, in at least one example, the dependent process 106 is part of a virtualization platform configured to implement virtual machines and applications in collaboration with the broker 104.

In certain examples, the dependent process 106 is configured to generate messages addressed to one or more of the directory services 102. These messages can include standard identifiers and/or encoded identifiers. In some examples, the dependent process 106 is configured to identify encoded identifiers within the messages, decode the encoded identifiers to generate arbitrary identifiers, and transmit messages including the arbitrary identifiers to the one or more directory services 102.

In some examples, to decode the encoded identifiers, the dependent process 106 is configured to invoke the decoder 112 and provide the decoder 112 with the encoded identifiers. In these examples, the decoder 112 is configured to execute a decoding process to generate arbitrary identifiers corresponding to the encoded identifiers. In some examples, the decoder 112 accesses the identifier data store 110 during execution of the decoding process, although this is not a requirement. For instance, in some examples, the decoding process decodes encoded identifiers without accessing the identifier data store 110. In these examples, the decoding process reverses the encoding process executed by the encoder 108. Further details regarding decoding processes that the decoder 112 is configured to execute in various examples are described further below with reference to FIG. 9. However, regardless of the particulars of the decoding process, the structure and semantics of the arbitrary identifiers generated by the decoder 112 are compatible with and can be successfully processed by the directory services 102.

Figure 2:
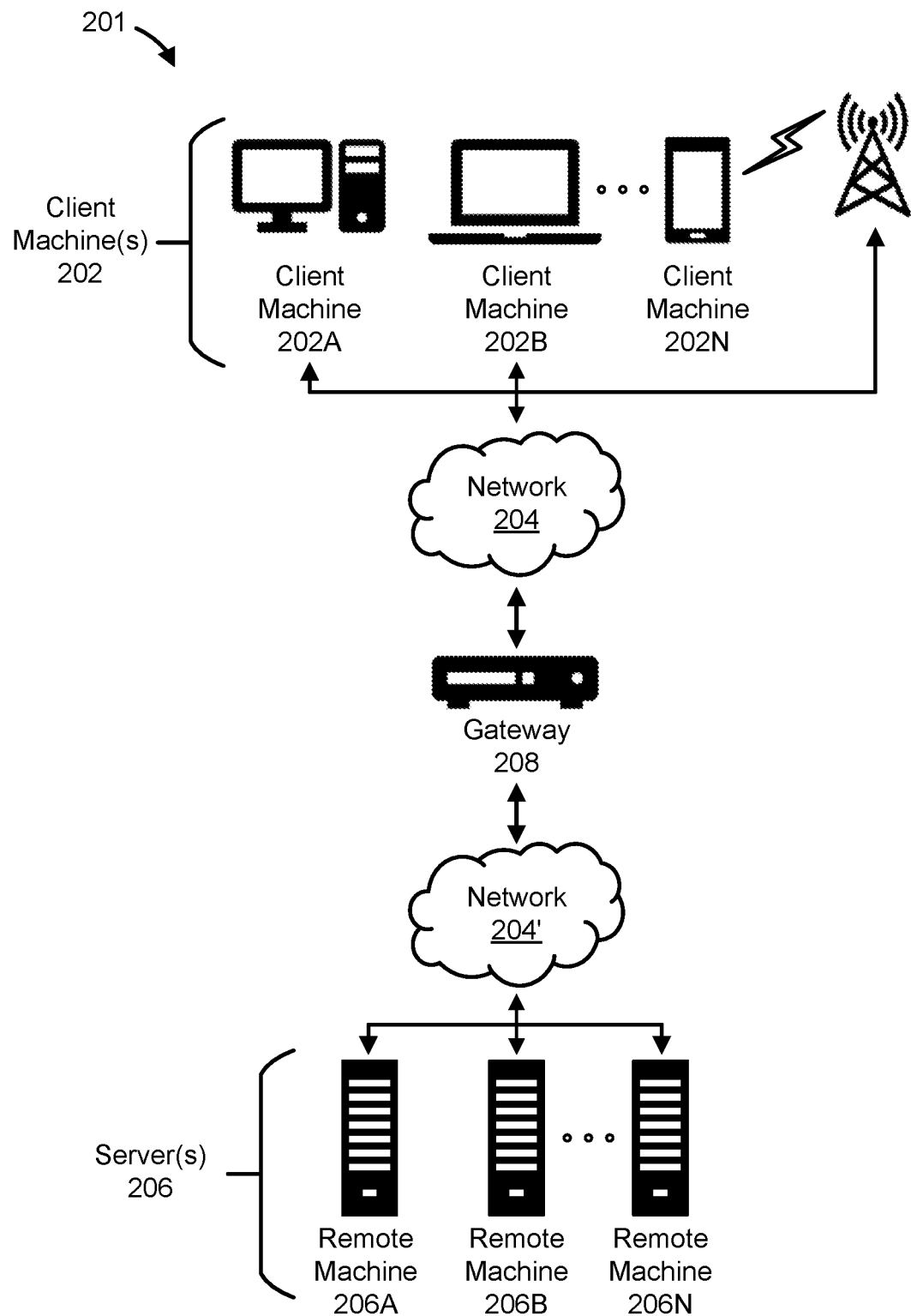
FIG. 2 is a block diagram of a network environment of computing devices in which various aspects of the present disclosure can be implemented.

Referring to FIG. 2, a non-limiting network environment 201 in which various aspects of the disclosure can be implemented includes one or more client machines 202A-202N, one or more remote machines 206A-206N, one or more networks 204, 204', and one or more appliances 208 installed within the computing environment 201. The client machines 202A-202N communicate with the remote machines 206A-206N via the networks 204, 204'. The computing environment 201 can also be referred to as a distributed computer system.

In some examples, the client machines 202A-202N communicate with the remote machines 206A-206N via an intermediary appliance 208. The illustrated appliance 208 is positioned between the networks 204, 204' and may also be referred to as a network interface or gateway. In some examples, the appliance 208 can operate as an ADC to provide clients with access to business applications and other data deployed in a datacenter, the cloud, or delivered as Software as a Service (SaaS) across a range of client devices, and/or provide other functionality such as load balancing, etc. In some examples, multiple appliances 208 can be used, and the appliance(s) 208 can be deployed as part of the network 204 and/or 204'.

The client machines 202A-202N may be generally referred to as client machines 202, local machines 202, clients 202, client nodes 202, client computers 202, client devices 202, computing devices 202, endpoints 202, or endpoint nodes 202. The remote machines 206A-206N may be generally referred to as servers 206 or a server farm 206. In some examples, a client device 202 can have the capacity to function as both a client node seeking access to resources provided by a server 206 and as a server 206 providing access to hosted resources for other client devices 202A-202N. The networks 204, 204' may be generally referred to as a network 204. The networks 204 can be configured in any combination of wired and wireless networks.

A server 206 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 206 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 206 can execute a remote presentation services program or other program that uses a thin client or a remote-display protocol to capture display output generated by an application executing on a server 206 and transmit the application display output to a client device 202.

In yet other examples, a server 206 can execute a virtual machine providing, to a user of a client device 202, access to a computing environment. The client device 202 can be a virtual machine. The virtual machine can be managed by, for example, a hypervisor, a virtual machine manager (VMM), or any other hardware virtualization technique within the server 206.

In some examples, the network 204 can be: a local area network (LAN); a metropolitan area network (MAN); a wide area network (WAN); a primary public network 204; and a primary private network 204. Additional examples can include a network 204 of mobile telephone networks that use various protocols to communicate among mobile devices. For short range communications within a wireless local-area network (WLAN), the protocols can include 802.11, Bluetooth, and Near Field Communication (NFC).

Figure 3:
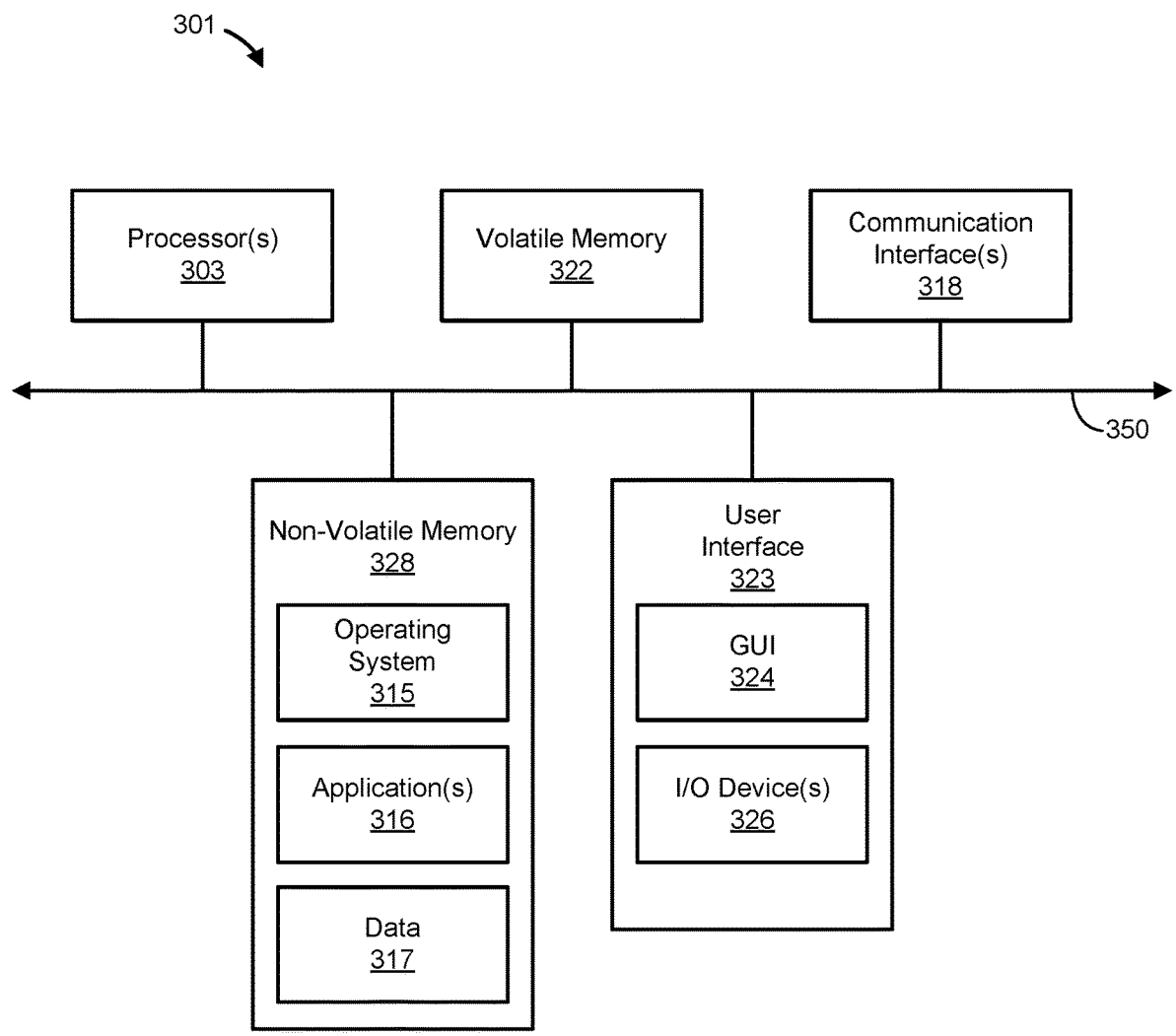
FIG. 3 is a block diagram of a computing device that can implement one or more of the computing devices of FIG. 2 in accordance with an example of the present disclosure.

FIG. 3 depicts a block diagram of a computing device 301 useful for practicing an example of client devices 202, appliances 208 and/or servers 206. The computing device 301 includes one or more processors 303, volatile memory 322 (e.g., random access memory (RAM)), non-volatile memory 328, user interface (UI) 323, one or more communications interfaces 318, and a communications bus 350. The computing device 301 may also be referred to as a computer or a computer system.

The non-volatile memory 328 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 323 can include a graphical user interface (GUI) 324 (e.g., a touchscreen, a display, etc.) and one or more input/output (I/O) devices 326 (e.g., a mouse, a keyboard, a microphone, one or more speakers, one or more cameras, one or more biometric scanners, one or more environmental sensors, and one or more accelerometers, etc.).

The non-volatile memory 328 stores an operating system 315, one or more applications 316, and data 317 such that, for example, computer instructions of the operating system 315 and/or the applications 316 are executed by processor(s) 303 out of the volatile memory 322. In some examples, the volatile memory 322 can include one or more types of RAM and/or a cache memory that can offer a faster response time than a main memory. Data can be entered using an input device of the GUI 324 or received from the I/O device(s) 326. Various elements of the computer 301 can communicate via the communications bus 350.

The illustrated computing device 301 is shown merely as an example client device or server and can be implemented by any computing or processing environment with any type of machine or set of machines that can have suitable hardware and/or software capable of operating as described herein.

The processor(s) 303 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 303 can be analog, digital or mixed. In some examples, the processor 303 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 318 can include one or more interfaces to enable the computing device 301 to access a computer network such as a Local Area Network (LAN), a Wide Area Network (WAN), a Personal Area Network (PAN), or the Internet through a variety of wired and/or wireless connections, including cellular connections.

In described examples, the computing device 301 can execute an application on behalf of a user of a client device. For example, the computing device 301 can execute one or more virtual machines managed by a hypervisor. Each virtual machine can provide an execution session within which applications execute on behalf of a user or a client device, such as a hosted desktop session. The computing device 301 can also execute a terminal services session to provide a hosted desktop environment. The computing device 301 can provide access to a remote computing environment including one or more applications, one or more desktop applications, and one or more desktop sessions in which one or more applications can execute.

Additional descriptions of a computing device 301 configured as a client device 202 or as a server 206, or as an appliance intermediary to a client device 202 and a server 206, and operations thereof, may be found in U.S. Pat. Nos. 9,176,744 and 9,538,345.

Figure 4:
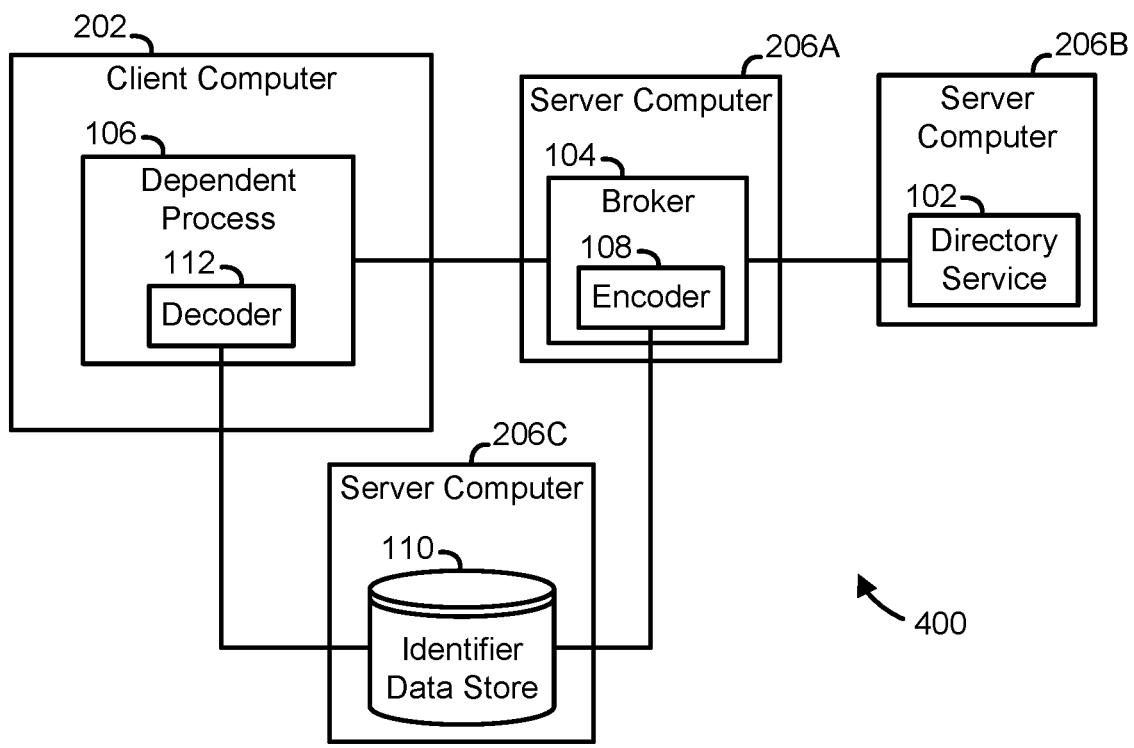
FIG. 4 is a block diagram of the adaptive identification system of FIG. 1 as implemented by a specific configuration of computing devices in accordance with an example of the present disclosure.

FIG. 4 illustrates an adaptive identification system (e.g., the system 100 of FIG. 1) configured for operation within a distributed computing platform (e.g. the network environment 201 of FIG. 2). As shown in FIG. 4, configuration 400 includes the client computer 202 and the server computers 206A-206C of FIG. 2. Within the configuration 400, the computer systems 202 and 206A-206C are communicatively coupled to one another and exchange data via a network (e.g., the networks 204 and/or 204' of FIG. 2).

As illustrated in FIG. 4, the server 206A is configured to host the broker 104 of FIG. 1. The server 206B is configured to host the directory service 102 of FIG. 1. The server 206C is configured to host the identifier data store 110 of FIG. 1. The client 202 is configured to host the dependent process 106. Many of the components illustrated in FIG. 4 are described above with reference to FIGS. 1 and 2. For purposes of brevity, those descriptions will not be repeated here, but each of the components of FIGS. 1 and 2 included in FIG. 4 is configured to function with reference to FIG. 4 as described with reference to FIGS. 1 and 2. However, the descriptions of any of these components may be augmented or refined below.

In at least some examples in accordance with FIG. 4, the configuration 400 implements a Citrix® Workspace™ application installation. In these examples, the directory service 102 can include a Microsoft® Azure® Active Directory® service, the broker 104 can include a Citrix® broker service, and the dependent process 106 can include a Citrix® XenApp® application installation.

The configuration 400 is but one example of many potential configurations that can be used to implement the system 100. For instance, in some examples, the server computer 206A is configured to host a version of the broker 104 that includes both the encoder 108 and the decoder 112. In these examples, rather than including and locally executing the decoder 112, the dependent process 106 is configured to transmit messages to the broker 104 requesting that the broker invoke the decoder 112 to execute decoding processes using encoded identifiers specified in the messages. The broker 104, in turn, is configured to process these messages from the dependent process 106. This processing can include invocation of the decoder 112 as requested by the dependent process 106 to generate arbitrary identifiers corresponding to the encoded identifiers and transmission of messages including the arbitrary identifiers to the directory service 102 on behalf of the dependent process 106. Alternatively or additionally, in some examples, the dependent process 106 is configured to receive response messages from the broker 104 that include arbitrary identifiers corresponding to and decoded from the encoded identifiers. The dependent process 106 can be configured to, for example, use the arbitrary identifiers to communicate with the directory service 102. As such, the examples disclosed herein are not limited to the particular configuration 400 and other configurations are considered to fall within the scope of this disclosure.

Figure 5:
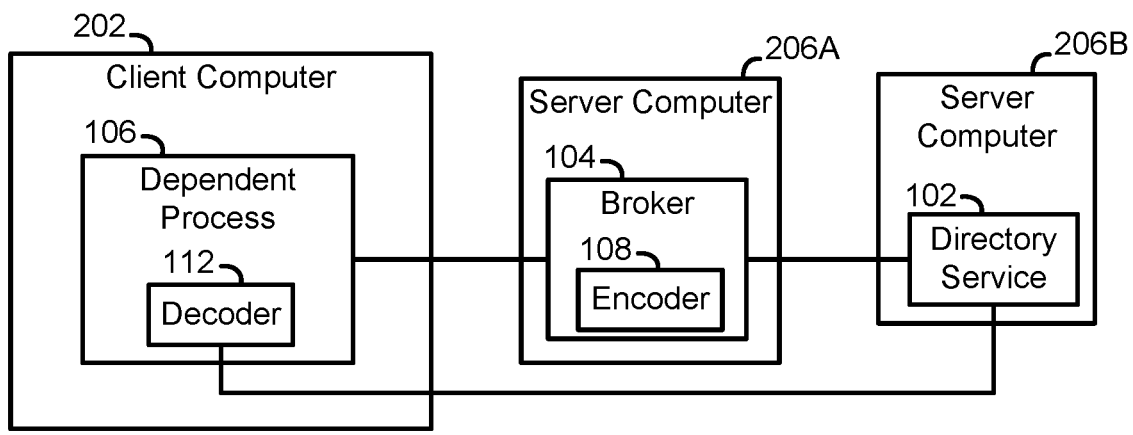
FIG. 5 is a block diagram of the adaptive identification system of FIG. 1 as implemented by a specific configuration of computing devices in accordance with an example of the present disclosure.

FIG. 5 illustrates an adaptive identification system (e.g., the system 100 of FIG. 1) configured for operation within a distributed computing platform (e.g. the network environment 201 of FIG. 2). As shown in FIG. 5, configuration 500 includes the client computer 202 and the server computers 206A and 206B of FIG. 2. Within the configuration 500, the computer systems 202, 206A, and 206B are communicatively coupled to one another and exchange data via a network (e.g., the networks 204 and/or 204' of FIG. 2).

As shown in FIG. 5, the server 206A is configured to host the broker 104 of FIG. 1. The server 206B is configured to host the directory service 102 of FIG. 1. The client 202 is configured to host the dependent process 106. Many of the components illustrated in FIG. 5 are described above with reference to FIGS. 1 and 2. For purposes of brevity, those descriptions will not be repeated here, but each of the components of FIGS. 1 and 2 included in FIG. 5 is configured to function with reference to FIG. 5 as described with reference to FIGS. 1 and 2. However, the descriptions of any of these components may be augmented or refined below.

As illustrated in FIG. 5, the encoder 108 and the decoder 112 are configured to execute encoding and decoding processes that do not store or retrieve associations between encoded identifiers and arbitrary identifiers, such as can be stored in the identifier data store 110 of FIG. 1. Rather, in the configuration 500, the encoder 108 executes an encoding process that is reversible by the decoding process executed by the decoder 112. To enable the reversible decoding process, the encoded identifiers generated within the configuration 500 include information required for the decoding process to generate the arbitrary identifiers corresponding to the encoded identifiers.

For example, where the structure and semantics of standard identifiers provides sufficient capacity and tolerance to store a lossless representation of any arbitrary identifier, the encoding process can store such a lossless representation as an encoded identifier. This can be the case where, for example, the arbitrary identifiers are constrained to a well-known size (e.g., number of bytes) that is less than or equal to the size of the standard identifiers and the value of the arbitrary identifiers can be represented in the standard identifiers without violating standard identifier semantics.

The configuration 500 is but one example of many potential configurations that can be used to implement the system 100. For instance, in some examples, the server computer 206A is configured to host a version of the broker 104 that includes both the encoder 108 and the decoder 112. In these examples, rather than including and locally executing the decoder 112, the dependent process 106 is configured to transmit messages to the broker 104 requesting that the broker invoke the decoder 112 to execute decoding processes using encoded identifiers specified in the messages. The broker 104, in turn, is configured to process these messages from the dependent process 106. This processing can include invocation of the decoder 112 as requested by the dependent process 106 to generate arbitrary identifiers corresponding to the encoded identifiers. Further, in these examples, the dependent process 106 is configured to receive messages from the broker 104 that include arbitrary identifiers corresponding to and decoded from the encoded identifiers. The dependent process 106 can be configured to, for example, use the arbitrary identifiers to communicate with the directory service 102. As such, the examples disclosed herein are not limited to the particular configuration 500 and other configurations are considered to fall within the scope of this disclosure.

Adaptive Identification Processes

Figure 6:
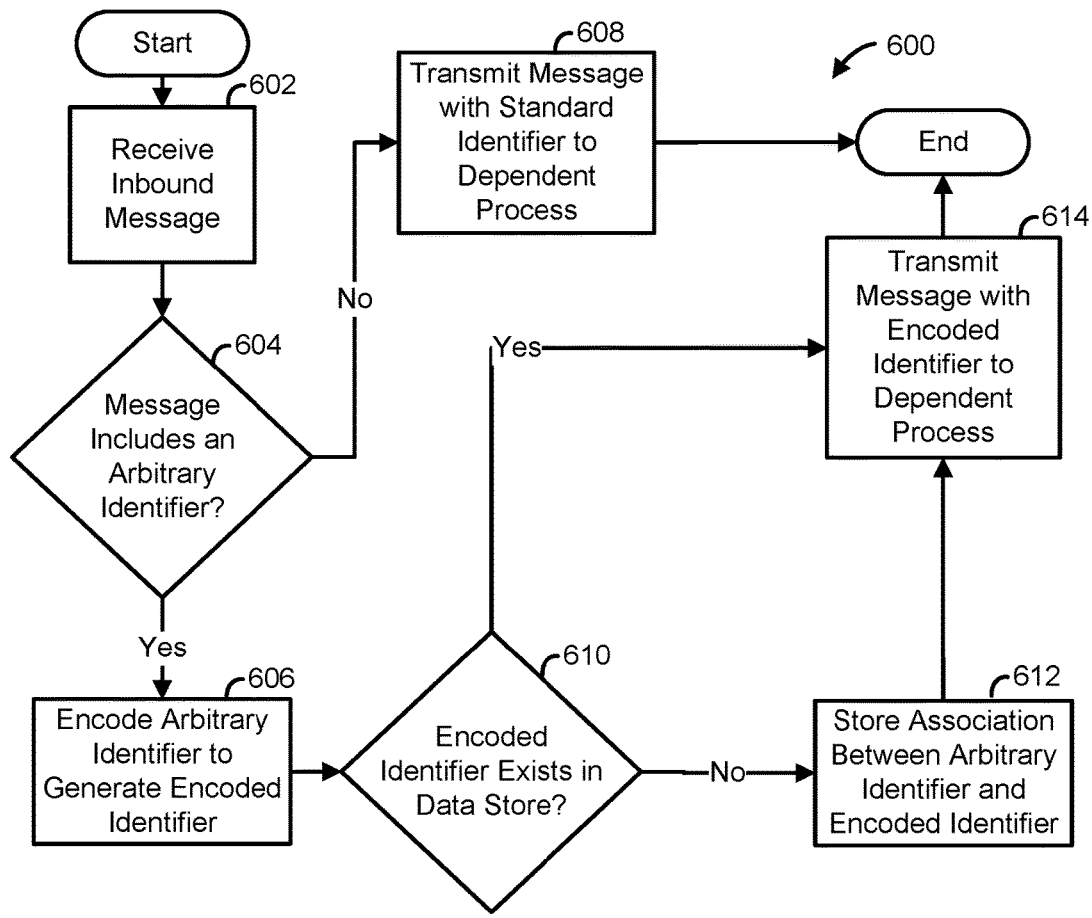
FIG. 6 is a flow diagram of an inbound adaptive identification process in accordance with an example of the present disclosure.

As described above, some examples of the system 100 of FIG. 1 are configured to execute inbound adaptive identification processes. FIG. 6 illustrates an inbound adaptive identification process 600 executed by the system 100 in some examples.

The process 600 starts with a broker (e.g., the broker 104 of FIG. 1) receiving 602 an inbound message from an identity provider (e.g., one of the directory services 102 of FIG. 1). This inbound message can specify an arbitrary identifier that represents a system element (e.g., a user). The arbitrary identifier can be, for example, a GUID of an object (e.g., a directory object) instantiated by the identity provider. The inbound message can also specify an event that the broker is configured to process in collaboration with dependent executable code (e.g., the dependent process 106 of FIG. 1). For instance, the inbound message can specify that the user has launched a virtual computing session.

Figure 7:
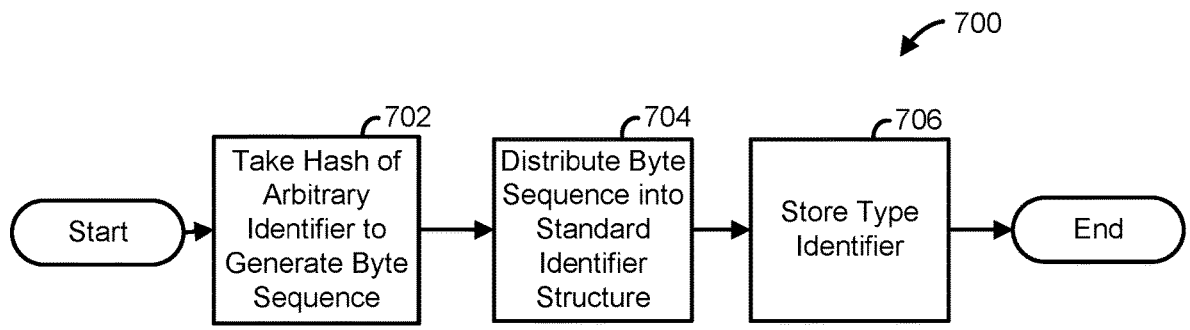
FIG. 7 is a flow diagram of an encoding process in accordance with an example of the present disclosure.

In response to reception of the inbound message, the broker determines 604 whether the inbound message includes one or more arbitrary identifiers. For instance, the broker can compare the structure and semantics of identifiers included in the inbound message to the structure and semantics of a standard identifier. Where this comparison generates a matches for all identifiers (e.g., the structures are the same and the values stored in the structure are valid), the broker determines 604 that the inbound message does not include an arbitrary identifier. Where this comparison does not generate matches for all identifiers, the broker determines 604 that the inbound message does not include an arbitrary identifier (i.e., the inbound message includes only standard identifiers).

Where the broker determines 604 that the inbound message includes no arbitrary identifiers, the broker transmits 608 a collaborative message to the dependent process that includes the standard identifiers and the process 600 ends.

Where the broker determines 604 that the inbound message includes arbitrary identifiers, the broker encodes 606 the arbitrary identifier to generate an encoded identifier. For instance, the broker can invoke an encoder (e.g., the encoder 108 of FIG. 1) to execute an encoding process, such as the encoding process 700 illustrated in FIG. 7. As shown in FIG. 7, the process 700 starts with the encoder executing 702 a hash function on a string representation of the arbitrary identifier to generate a sequence of bytes having a predetermined length less than or equal to the length of a standard identifier. This hash function can be, for example, an SHA 256 hash that produces a 32 byte hash value. Next, the encoder distributes 704 the sequence of bytes into the structure of a standard identifier. The encoder completes the process 700 by padding the structure, if necessary, and storing 706 a type identifier in the structure that indicates the structure houses an encoded identifier.

Figure 8:
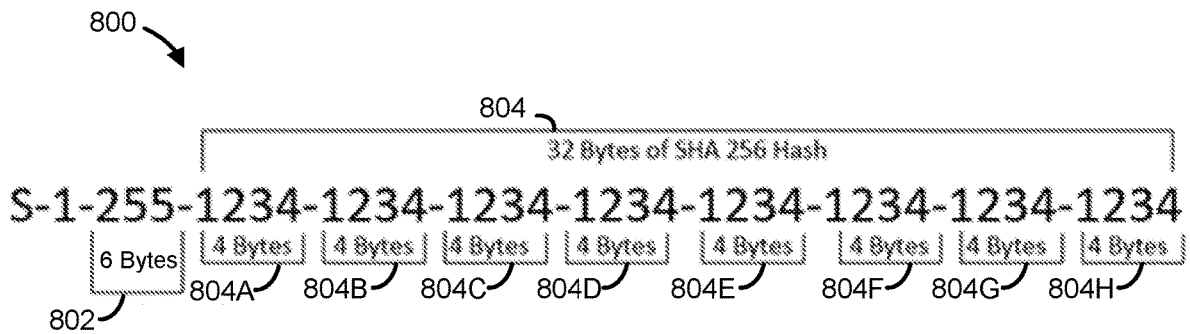
FIG. 8 is a schematic diagram of standard identifier in accordance with an example of the present disclosure.

FIG. 8 illustrates an encoded identifier 800 generated via a process in accordance with the process 700. As shown in FIG. 8, the encoded identifier 800 adheres to a Microsoft® Active Directory® SID structure. The encoded identifier 800 begins with a revision number "S-1" and includes a 6 byte IdentifierAuthority field 802, and an array of 4 byte SubAuthority fields 804A-804G, collectively referred to as a SubAuthority array 804. As shown in FIG. 8, the IdentifierAuthority field 802 stores a type identifier "255" that indicates the identifier 800 is an encoded identifier. Each member of the SubAuthority array 804 stores 4 bytes of the hash value of the arbitrary identifier taken in the act 702. In some examples, the type identifier is associated with a specific type of identity provider object. For instance, in at least one example, a type identifier value of "255" is associated with user accounts while a type identifier value of "254" is associated with virtual machine accounts. Other values of type identifiers and associated identity provider objects can be included in various examples.

Returning to the process 600 illustrated in FIG. 6, the broker determines 610 whether the encoded identifier exists in an identifier data store (e.g., the identifier data store 110 of FIG. 1). If the broker determines 610 that the encoded identifier does not exist in the identifier data store, the broker stores 612 an association between the arbitrary identifier and the encoded identifier in the identifier data store. If the broker determines 610 that the encoded identifier exists in the identifier data store, the broker transmits 614 a message to the dependent process that includes the encoded identifier for subsequent collaborative processing.

Processes in accordance with the process 600 enable the system 100 to map inbound arbitrary identifiers to standard, encoded identifiers that are compatible with existing, dependent process. As shown in FIG. 6, the process 600 stores associations between arbitrary identifiers and encoded identifiers within an identifier data store. In other examples, where the encoded identifiers store information sufficient to generate the corresponding arbitrary identifiers via a decoding process, utilization of the identifier data store, and the actions required to do so, are omitted. For example, where the size of arbitrary identifiers is less than the size of standard identifiers, the encoding process can simply pad (e.g., add 0's,), compress, or otherwise losslessly transform the arbitrary identifiers to increase their size to the standard size to successfully encode them and generate encoded identifiers. Such examples are within the scope of this disclosure.

Figure 9:
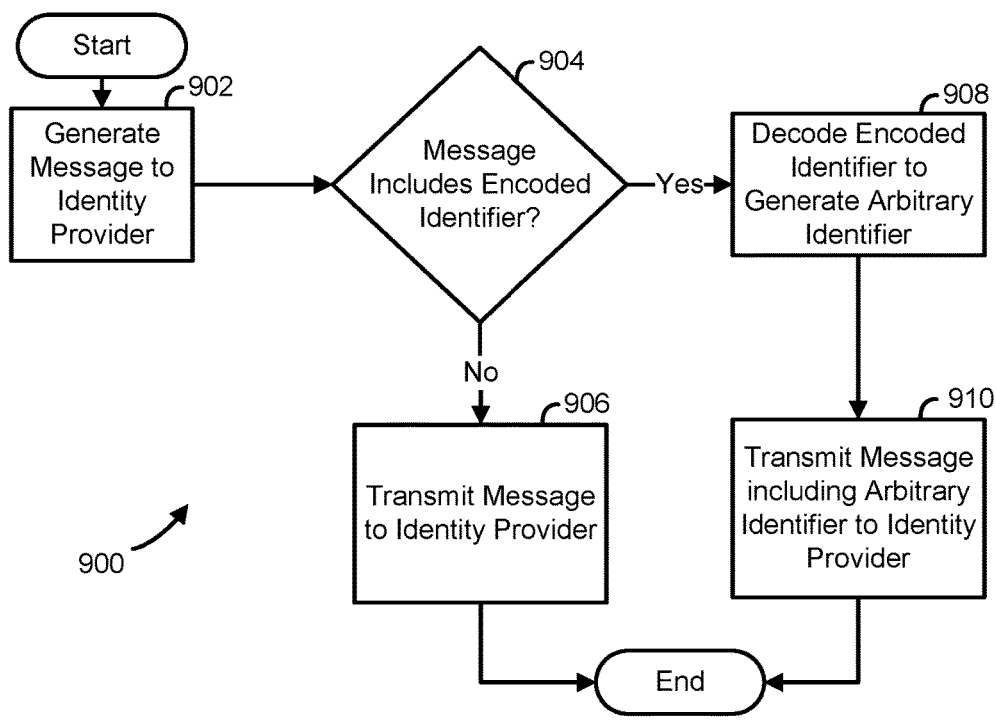
FIG. 9 is a flow diagram of an outbound adaptive identification process in accordance with an example of the present disclosure.

As described above, some examples of the system 100 of FIG. 1 are configured to execute outbound adaptive identification processes. FIG. 9 illustrates an outbound adaptive identification process 900 executed by the system 100 in some examples.

The process 900 starts with the dependent process generating 902 an outbound message for processing by the identity provider upon which the dependent process is reliant. This outbound message can specify an encoded identifier that represents a system element (e.g., a user). The encoded identifier can be, for example, a SID of an object (e.g., a directory object) instantiated by the identity provider. The outbound message can also specify a query for information regarding the system element. For instance, the outbound message can request that the name of a user has launched a virtual computing session.

During or after generation of the outbound message, the dependent process determines 904 whether the outbound message includes one or more encoded identifiers. For instance, the dependent process can compare one or more values associated with encoded identifiers to a type identifier field in each identifier in the outbound message. Where this comparison generates a match (e.g., the value stored in the type identifier field equals a value associated with encoded identifiers), the dependent process determines 904 that the outbound message includes an encoded identifier. Where this comparison does not generate a match, the dependent process determines 904 that the outbound message does not include an encoded identifier.

Where the dependent process determines 904 that the outbound message includes an encoded identifier, the dependent process decodes 908 the encoded identifier to generate an arbitrary identifier. For instance, the dependent process can invoke an decoder (e.g., the decoder 112 of FIG. 1) to execute an decoding process. In some examples, the decoding process searches the identifier data store for an association between the encoded identifier and an arbitrary identifier. In these examples, the decoder successfully decodes an encoded identifier and generates the corresponding arbitrary identifier by identifying a matching association (e.g., a record storing the encoded identifier) in the identifier data store. In some examples, where the encoded identifier contains sufficient information, the decoding process reverses the actions used to encode the encoded identifier. For example, where the encoding process simply pads an arbitrary identifier to generate an encoded identifier, the decoding process simply removes the pads to successfully decode the encoded identifier and generate the arbitrary identifier. After successfully decoding any encoded identifiers in the outbound message, the dependent process transmits 910 a message to the identity provider. This message includes the arbitrary identifiers generated by decoding 908 the encoded identifiers.

Where the dependent process determines 904 that the outbound message does not include an encoded identifier, the dependent process transmits 906 a message to the identity provider. The message includes the standard identifiers stored in the original outbound message.

Processes in accordance with the process 900 enable the system 100 to map outbound encoded identifiers that are compatible with existing, dependent process to arbitrary identifiers used by identity providers, such as can be hosted within or otherwise integrated with directory services.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:
 a memory; and
 at least one processor coupled to the memory and configured to:
  receive a first message from an identity provider, the first message including an arbitrary identifier generated by the identity provider, the arbitrary identifier being incompatible with a dependent process that is reliant upon the identity provider;
  encode, in response to reception of the first message, the arbitrary identifier into an encoded identifier that is compatible with the dependent process, wherein to encode comprises to generate a value based on the arbitrary identifier; and
  the encoded identifier includes a first field, a second field, and a field array comprising at least a third field, the field array storing the generated value; and
 transmit a second message including the encoded identifier to the dependent process.

2. The computer system of claim 1, wherein the at least one processor is further configured to:
 generate, via the dependent process, a third message addressed to the identity provider, the third message including the encoded identifier;
 decode the encoded identifier to generate a copy of the arbitrary identifier; and
 transmit a fourth message including the copy of the arbitrary identifier to the identity provider.

3. The computer system of claim 1, wherein the encoded identifier is a security identifier (SID), and the field array comprises a plurality of SubAuthority fields.

4. The computer system of claim 1, wherein the second field of the encoded identifier stores a type identifier that designates the encoded identifier as being of an encoded type.

5. The computer system of claim 1, wherein the identity provider is a directory service.

6. The computer system of claim 5, wherein the arbitrary identifier is a global unique identifier.

7. The computer system of claim 1, wherein to encode comprises to:
 execute a hash function to generate a hash value; and
 distribute the hash value into the encoded identifier.

8. The computer system of claim 1, wherein the at least one processor is further configured to store an association between the encoded identifier and the arbitrary identifier in the memory.

9. The computer system of claim 8, wherein the at least one processor is further configured to identity the association in the memory to decode the encoded identifier.

10. The computer system of claim 1, wherein to encode comprises to execute a reversible encoding process and the at least one processor is further configured to decode the encoded identifier by reversing the reversible encoding process.

11. The computer system of claim 1, wherein the first field of the encoded identifier stores a revision number.

12. A method of integrating identity providers with incompatible dependent processes executing on a computer system comprising at least one processor coupled to a memory, the method comprising:
 receiving, by the at least one processor, a first message from an identity provider, the first message including an arbitrary identifier generated by the identity provider, the arbitrary identifier being incompatible with a dependent process that is reliant upon the identity provider;
 encoding, by the at least one processor in response to receiving the first message, the arbitrary identifier into an encoded identifier that is compatible with the dependent process, wherein
  encoding the arbitrary identifier into the encoded identifier comprises generating a value based on the arbitrary identifier; and
  the encoded identifier includes a first field, a second field, and a field array comprising at least a third field, wherein the field array stores the generated value;

transmitting, by the at least one processor, a second message including the encoded identifier to the dependent process;

generating, by the at least one processor via the dependent process, a third message addressed to the identity provider, the third message including the encoded identifier;

decoding, by the at least one processor, the encoded identifier to generate a copy of the arbitrary identifier; and transmitting, by the at least one processor, a fourth message including the copy of the arbitrary identifier to the identity provider.

13. The method of claim 12, wherein encoding comprises generating a security identifier (SID) storing a type identifier that designates the encoded identifier as being of an encoded type.

14. The method of claim 12, wherein receiving the first message comprises receiving a message from a directory service that includes a global unique identifier.

15. The method of claim 12, wherein encoding comprises:
executing a hash function to generate a hash value; and
distributing the hash value into the encoded identifier.

16. The method of claim 12, further comprising storing an association between the encoded identifier and the arbitrary identifier in the memory, wherein decoding the encoded identifier includes identifying the association stored in the memory.

17. The method of claim 12, wherein encoding comprises executing a reversible encoding process and decoding the encoded identifier comprises reversing the reversible encoding process.

18. A non-transitory computer readable medium storing computer executable instructions to integrate identity providers with incompatible dependent processes, the computer executable instructions comprising instructions to:

receive a first message from an identity provider, the first message including an arbitrary identifier generated by the identity provider, the arbitrary identifier being incompatible with a dependent process that is reliant upon the identity provider;

encode, in response to receiving the first message, the arbitrary identifier into an encoded identifier that is compatible with the dependent process, wherein
to encode comprises to generate a value based on the arbitrary identifier; and
the encoded identifier includes a first field, a second field, and a field array comprising at least a third field, the field array storing the generated value;

transmit a second message including the encoded identifier to the dependent process;

generate, via the dependent process, a third message addressed to the identity provider, the third message including the encoded identifier; and decode the encoded identifier to generate a copy of the arbitrary identifier.

19. The computer readable medium of claim 18, wherein the computer executable instructions further comprise instructions to transmit a fourth message including the copy of the arbitrary identifier to the identity provider.

20. The computer readable medium of claim 18, wherein the instructions to encode comprise instructions to generate a security identifier (SID) storing a type identifier that designates the encoded identifier as being of an encoded type.

21. The computer readable medium of claim 18, wherein the instructions to encode comprise instructions to:
execute a hash function to generate a hash value; and
distribute the hash value into the encoded identifier.

22. The computer readable medium of claim 18, wherein the computer executable instructions further comprise instructions to store an association between the encoded identifier and the arbitrary identifier in a memory and the instructions to decode the encoded identifier include instructions to identify the association stored in the memory.

23. The computer readable medium of claim 18, wherein the instructions to encode comprise instructions to execute a reversible encoding process and the instructions to decode the encoded identifier comprise instructions to reverse the reversible encoding process.

* * * * *